No. 761,535. PATENTED MAY 31, 1904.
J. E. NEWTON.
SPARKING PLUG TESTING APPARATUS.
APPLICATION FILED OCT. 21, 1903.
NO MODEL.
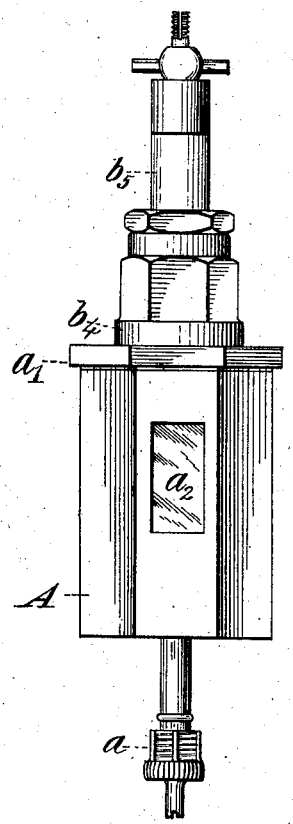
Fig. 1.
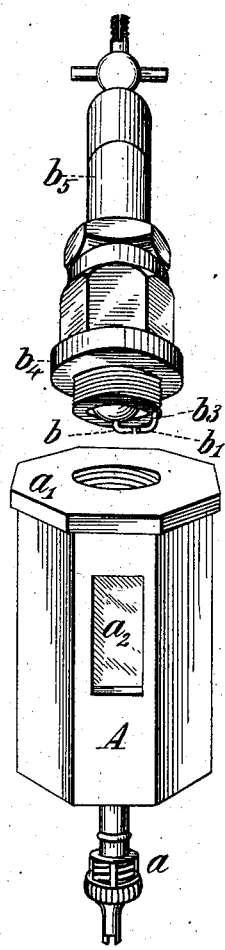
Fig. 3.
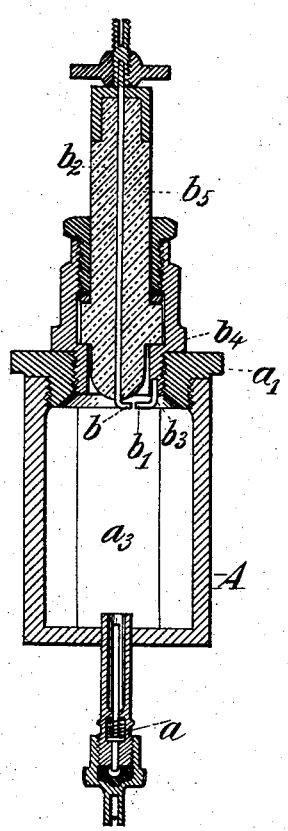
Fig. 2.
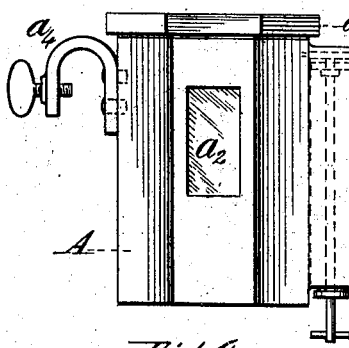
Fig. 4.
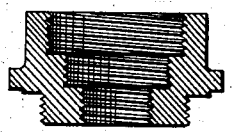
Fig. 6.
Fig. 5.
Witnesses:
H. E. Aylward.
William Odlin
Inventor:
James Edward Newton
by his attorney
Charles F. Richardson No. 761,535.

Patented May 31, 1904.

UNITED STATES PATENT OFFICE.

JAMES EDWARD NEWTON, OF FALL RIVER, MASSACHUSETTS.

SPARKING-PLUG-TESTING APPARATUS.

SPECIFICATION forming part of Letters Patent No. 761,535, dated May 31, 1904.

Application filed October 21, 1903. Serial No. 177,872. (No model.)

*To all whom it may concern:*

Be it known that I, JAMES EDWARD NEWTON, a citizen of the United States, residing at Fall River, in the county of Bristol and State of Massachusetts, have invented certain new and useful Spark-Plug-Testing Apparatus, of which the following is a specification.

My invention relates to spark-plugs for gasolene-engines; and its principal feature resides in means to determine whether or not a spark-plug will spark in a cylinder whose pressure is above that of the atmosphere. Said means may be used for other purposes—for example, as determining whether or not there is such a leakage of gas through the spark-plug as will render it useless.

When a gasolene-engine stops, the operator in his attempt to discover the cause examines, among other parts, the spark-plug. This he removes from the engine-cylinder and then in the outside air passes an electrical current therethrough. If it sparks at the gap, he feels assured the defect is not in the plug and restores the plug to the cylinder; still the engine refuses to move. It has been found that notwithstanding the fact that the plug will spark at the spark-gap when in the atmosphere yet when in the cylinder it may not so do, such failure to spark being due, perhaps, to a break in the insulation out of sight and within the plug. The explanation of such failure to spark at the gap seems to be that the resistance offered to the passage of the electrical current across the spark-gap and greatly increased by the pressure within the engine-cylinder is greater than the resistance between the circuit-wires at the broken insulation, and hence the current will flow and the sparking will occur at said break and not at the spark-gap. In short, the sparking at the gap in the atmosphere does not disprove a possible short-circuiting within the plug.

Now the object of my invention is to provide testing apparatus whereby said short-circuiting—as, for example, a broken insulation—may be detected without taking the spark-plug to pieces, said testing apparatus being designed and adapted to surround said spark-gap with an atmosphere having a pressure similar to that under which the spark-gap operates in the cylinder and to permit said spark-gap to be under observation during said test.

Figure 1 is an elevation showing my testing apparatus associated with a spark-plug. Fig. 2 is a vertical central section thereof. Fig. 3 is a perspective view of the spark-plug and testing apparatus ready for assembling. Fig. 4 shows same apparatus provided with a hand air-pump and also a hook to suspend said apparatus, and Fig. 5 shows said apparatus having a gage-cock to determine the pressure within the testing apparatus. Fig. 6 shows a modified form of cap.

In the drawings illustrating the principle of my invention and the best mode now known of embodying that principle, A is a metallic chambered member provided with air-inlet valve $a$ of the ordinary bicycle type, a cap $a'$, closing the open portion of said member and having a hole for the reception of the threaded spark-plug B, the screw-threads for said member and said cap being the same in direction, so that plug, cap, and chambered member may be tightly assembled by turning the plug and cap in the same direction. A glass $a^2$ is mounted in the side of said member A, and when the spark-plug B is assembled with said cap $a'$ and said member A the user of the apparatus may look through the glass $a^2$ and see the spark-gap $b\ b'$ of said spark-plug A, confined within the chamber $a^3$ of said member A.

The spark-plug B may be of any well-known construction, that shown having a leading-in wire $b^2$ and a leading-out wire $b^3$ electrically connected with the metal case $b^4$, the respective terminals $b^2\ b^3$ forming the spark-gap. These wires $b^2\ b^3$ are insulated from each other by a porcelain tube $b^5$.

The operation of my invention is as follows: Upon the stoppage of the engine the spark-plug B is removed from the cylinder of the engine and screwed into the cap $a'$, which in turn is screwed upon the chambered member A. An air-pump is connected with the inlet-valve $a$ and the pressure within the air-tight chamber $a^3$ increased to or about that found in the engine-cylinder. The wires $b^2\ b^3$ are placed in closed electrical circuit. If on looking through the glass $a^2$ the operator sees sparking between the spark-terminals $b\ b'$, he knows the spark-plug is operative and there is no short-circuiting. If, on the other hand, there is no sparking, there is such short-circuiting—as, for instance, resulting at a break in the porcelain insulation $b^3$—which fact is immediately learned without taking the plug to pieces, and, further, without being deceived by sparking at gap in the open air, as above explained.

A leak in the spark-plug may be learned by plunging the plug into water, any leakage of air from the chamber making itself evident by air-bubbles escaping through the water. When so used, the glass $a^2$ or its equivalent may be dispensed with.

To complete the electrical circuit through the plug B, the metal member A is usually laid upon some metal work of the engine which is grounded; but to insure a good electrical contact conveniently said member has a metal hook $a^4$, as in Fig. 4, which may be caught upon any grounded metal work, say, of the engine. Said hook may have a thumb-screw, as shown, to fix the chambered member in a fixed position on whatever it is hooked.

This testing apparatus is small, light in weight, may be conveniently carried in one's pocket, and has been found to be of particular value in connection with the spark-plugs used in automobile-engines.

If one is called upon to test gasolene-engines having spark-plugs of different diameters, each chambered member may be provided with a cap having an opening therethrough whose threaded walls are of various diameters conically arranged in series and adapted to receive different spark-plugs. Such a cap is shown in Fig. 6, and when it is used the glass in the chambered member is mounted in the bottom thereof to render the possible sparking visible. In said Fig. 4 I have shown the member A provided with an air-pump $a^5$, affixed to the side thereof, while in Fig. 5 said member is provided with a pressure-gage $a^6$, with which accurate measurements of the pressure inside the testing apparatus may be made when desired. The operation and construction of the appliances in said Figs. 4 and 5 are so obvious that no further description is considered essential.

It will be plain that there may be made various formal changes in the above invention without departing from the spirit thereof. For example, while the chambered member is described as made of metal, and hence when so made forms part of the electrical circuit when the spark-plug shown is used, yet while metal may be preferable to use in making the chamber it might be made of a material which was not a good electrical conductor. In such case the outer terminal $b^4$ of the plug B could be grounded without making the chambered member a part of the circuit. Further, this member might consist of one piece not employing a cap $a'$, such as is shown. Also said member might be made of transparent or translucent material, and thus do away with the glass and the metal chambered member shown and described. Likewise any kind of suitable pressure-indicating device may be used. Also one may employ any pump to give the desired pressure within the chambered member. Clearly all these changes are formal. All that is essential to carry out my invention is to provide an air-tight chamber into which the spark-gap of the plug may be placed and subjected to a pressure greater than that of the atmosphere and from the outside of which chamber the light resulting from the sparking of the spark-gap may be easily observed.

Having described my invention and desiring to claim all the features thereof in the broadest manner legally possible, what I claim is—

1. A portable, spark-plug-testing device, made up of a member having a chamber therein; an inlet-valve for said chamber, whereby a pressure, like that under which said spark-plug usually operates, may be maintained; and an opening in said member, leading into said chamber, and designed to receive the spark-plug, to be tested, within said chamber; a portion of said device being provided with material, capable of transmitting to the operator, light, if any, arising from the sparking of the spark-plug within said chamber.

2. A portable, spark-plug-testing device, made up of a member having a chamber therein; a pressure-gage communicating with said chamber; an inlet-valve for said chamber, whereby a pressure, like that under which said spark-plug usually operates, may be maintained; and an opening in said member, leading into said chamber, and designed to receive the spark-plug, to be tested, within said chamber; a portion of said device being provided with material, capable of transmitting to the operator, light, if any, arising from the sparking of the spark-plug within said chamber.

3. A member having a chamber, an air-pump mounted on said member; an inlet-valve leading from said air-pump into said chamber; an opening leading into the chamber of said member for the reception of a spark-plug; a portion of said member capable of transmitting light.

4. A metallic member with a chamber; a cap to close partially said chamber, and provided with an opening leading into said chamber; said opening having a series of threaded walls of different diameters, conically arranged, and adapted to receive spark-plugs of corresponding diameters; an inlet-valve opening into said chamber; and a portion of said chambered member being of material capable of transmitting light.

5. A metallic member having a chamber; an inlet-valve, opening into said chamber, an opening leading into said chamber, for the reception of a spark-plug; and a metallic hook secured to said member to support said member, and ground the electrical circuit, of which said chambered member forms a part; and a portion of said member being of material capable of transmitting light.

6. A portable, spark-plug-testing device, made up of a member having a chamber therein; a pressure-gage communicating with said chamber; an inlet-valve for said chamber, whereby a pressure, like that under which said spark-plug usually operates, may be maintained; and an opening in said member, leading into said chamber, and designed to receive the spark-plug, to be tested, within said chamber; all designed to determine whether or not there is such a leakage of gas through the spark-plug, as will render it useless.

7. A portable, spark-plug-testing device, made up of a member having a chamber therein; an inlet for said chamber, whereby a pressure, like that under which said spark-plug usually operates, may be maintained; and an opening in said member, leading into said chamber, and designed to receive the spark-plug, to be tested, within said chamber; a portion of said device being provided with material, capable of transmitting to the operator, light, if any, arising from the sparking of the spark-plug within said chamber.

In testimony whereof I affix my signature in presence of two witnesses.

JAMES EDWARD NEWTON.

Witnesses:
RICHARD P. BORDEN,
ROBERT C. DAVIS.